United States Patent [19]

Nichols

[11] Patent Number: 5,089,130

[45] Date of Patent: Feb. 18, 1992

[54] FILTER CELL SHEET INSTALLATIONS

[75] Inventor: William R. Nichols, Richmond, Va.

[73] Assignee: Infilco Degremont Inc., Richmond, Va.

[21] Appl. No.: 617,587

[22] Filed: Nov. 26, 1990

[51] Int. Cl.⁵ .............................................. B01D 24/22
[52] U.S. Cl. ................................... 210/232; 210/264; 210/266; 210/275
[58] Field of Search ............... 210/232, 264, 266, 271, 210/275; 52/177, 654, 660, 664, 666

[56] References Cited

U.S. PATENT DOCUMENTS 2,302,450 11/1942 Laughlin ............................. 210/275

Primary Examiner—Robert A. Dawson
Assistant Examiner—Matthew O. Savage
Attorney, Agent, or Firm—Carroll F. Palmer

[57] ABSTRACT

Automatic backwash filter systems including a filter tank divided into a multiplicity of seriate cells of substantially the same width by a plurality of vertical rectangular cell sheets are improved by provision of new spacer assemblies to mitigate bowing of the cell sheets during backwashing or other operations applied to the cells. Such spacer assemblies include horizontally aligned bores that extend through each cell sheet adjacent their top, one or more stringers that extend through the bores, and a plurality of tubes of approximately the same length substantially equal to the width of the cells. One of such tubes is positioned in each filter cell surrounding the stringer present in such cell and between the surfaces of the respective cell sheets. Where a plurality of stringers are used in the spacer assemblies arrangements are disclosed for making final connections to complete the assemblies.

5 Claims, 2 Drawing Sheets

FILTER CELL SHEET INSTALLATIONS

BACKGROUND OF THE INVENTION

1. Field of the Invention

This application relates broadly to improvements in automatic backwash filtering systems. More particularly, it concerns improved filter cell sheet installations in such systems.

2. Description of the Prior Art

Automatic backwash filter systems are known in the art as exemplified in U.S. Pat. Nos. 3,239,061; 4,133,766; 4,617,131 and 4,764,288 currently assigned to Infilco Degremont Inc., the assignee of the invention disclosed herein. Such systems are further exemplified in Infilco Degremont's brochure DB-370, dated May, 1989, entitled ABW® Automatic Backwash Filter. The disclosures of these patents and the brochure are incorporated herein by reference.

In the backwash filter systems, cell sheets that divide the total filter bed into compartmented filter cells have a tendency to deflect (bow) when the cells are being backwashed. The resulting movement can cause seals associated with porous rigid plates, that are fixed at a level between the upper and lower ends of the cell sheets and transverse thereto, to fail allowing a media leak. In other cases, the cell sheets may bow towards each other which causes high backwash flow rates that, in turn, promotes media loss through the washwater systems. When the cell sheets bow away from each other, the backwash flow rate is reduced causing insufficient media expansion, hence allowing the media to become dirty. Of course, poor installation caused by difficulties in handling of parts forming the systems can also result in cell sheet bowage.

In an effort to mitigate the bowage problems with cell sheets in the subject filter systems, filter manufactures and fabricators, have resorted to use of nut and bolt tie rod assemblies. Each such assembly requires two holes in the cell sheet, a rod, four washers and four nuts. Each assembly must be put together one piece at a time, a precise measurement must be made and all nuts must be locked. Any such assembly which is not completely tight can be loosened and negate its purpose. Also if strict attention is not paid to measurements, compressive forces can allow sheets to bow.

The present invention addresses the problem of cell sheet bowage in automatic backwash filter systems and provides improved installations for the cell sheets that greatly simplify cell sheet installation, reduce the number of required parts, mitigate measurement requirements and reduce assembly costs.

OBJECTS

A principal object of the invention is the provision of improvements in automatic backwash filtering systems.

An other object is the provision of improved filter cell sheet installations in such systems.

Further objects include the simplification of prior methods of assembly of cell sheets in such filter systems, reduction in the number of parts required for cell sheet installation, mitigation of problems previously associated with need for high attention to installation measurements and reduction in assembly costs.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in automatic backwash filter systems that comprise a filter tank defined by a bottom, first and second opposed, parallel side walls and third and fourth opposed parallel side walls divided into a multiplicity of seriate cells of substantially the same width W, e.g., 8" to 20", by a plurality of substantially vertical rectangular cell sheets defined by a top edge, a bottom edge, a pair of side edges, a first exposed surface on one side of each the sheet and a second exposed surface on the other side of each the sheet, the cell sheets running parallel to the first and second side walls, each of the cells containing a horizontal rigid porous filter plate located between the exposed surface of its respective cell sheets at a position above the tank bottom, filter media contained in the cells and supported on the porous plates, influent means for delivering liquid to be filtered to the top of the filter media and effluent means for discharging liquid filtered through the media and the plates from the filter system at a level below the plates.

The improvements of the invention to such know filter systems comprise new spacer means to mitigate bowing of the cell sheets.

Such spacer means include bores extending through each of the cell sheets from the first surface to the second surface thereof, all such bores being horizontally aligned along a locus located a short distance below the top edges of the cell sheets.

The new spacer means further includes one or more flexible stringers having a length, e.g., 3 W or more, such that they extend through a plurality of the cell sheet bores, whereby they span multiple cells of the filter system, e.g., 3 or more cells. In a preferred embodiment, the stringers are flexible rods or tubes of diameter D, e.g., PVC tubes of about 0.25"–0.50" diameter with a length of 10 to 30 feet.

There are a plurality of rigid tubes of approximately the same length substantially equal to the width W of the cells. One such tube is positioned in each of the filter cells around the stringer and in between the respective exposed surfaces of the cell sheets defining the cell in question. In a preferred embodiment, the rigid tubes are PVC tubes of about 0.50"-1" diameter.

In a preferred embodiment, the first and second side walls of the filter tank each include a grouted buttress in which an all-thread rod is encased with one end thereof extending into the filter cell adjacent the buttress. Such rod extensions at the first and second side walls comprise the extreme ends of the stringers in the spacer means of the filter system. Between these extreme ends, one or more flexible rods or tubes as previously mentioned form the stringer or stringers around which the aforesaid rigid tubes are positioned.

In another embodiment of the invention, a single stringer is a rod that extends through all the bores in the cell sheets and the first and second side walls. The length of rod is such that its ends extend a short distance beyond the side walls, such ends are threaded and nuts are threaded on the both ends of the rod.

Several arrangements may be used to provide junctions between stringers in those embodiments where there are a plurality of stringers, rather than one.

Typically a plurality of the spacer means of the invention will be used in each filter system spaced apart along the length of cell sheets in order to provide full protection against bowing of the cell sheets.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
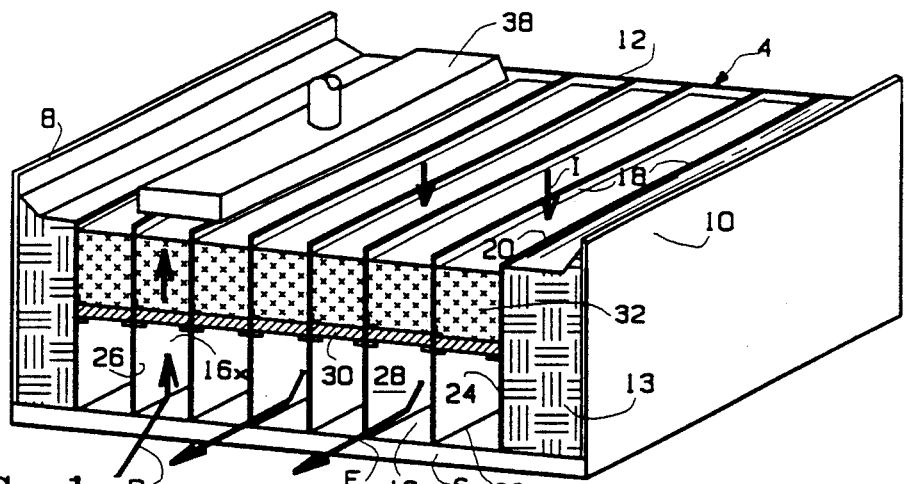
FIG. 1 is an isometric sectional view of an automatic backwash filter system of the prior art which are improved by the cell sheet installations of the invention.

Referring in detail to the drawings, FIG. 1 illustrates a known automatic backwash filter system 2 comprising a filter tank 4 having a bottom 6, first and second opposed, parallel side walls 8 and 10 respectively and third and fourth opposed parallel side walls 12 and not shown respectively. The walls 8 and 10 each comprise a grouted buttress 13.

The tank 4 is divided into a multiplicity of seriate cells 16 of substantially the same width W by a plurality of substantially vertical rectangular cell sheets 18 of substantially the same thickness. Sheets 18 have a top edge 20, a bottom edge 22, a pair of side edges 24, a first exposed surface 26 on one side and a second exposed surface 28 on the other side of each the sheet 18.

The cell sheets 18 run parallel to the first and second side walls 8 and 10 and each of the cells 18 contains a horizontal rigid porous filter plate 30 located between the exposed surfaces 26 and 28 of its respective cell sheets at a position above the tank bottom 6. Lugs 34 serve to support the plates 30 and angle members 36 hold them in position against the force of fluid flow through the cells 16.

Filter media 32 is contained in the cells 16 and supported on the porous plates 30. The media 32 in FIGS. 2-5 is not hatched for the sake of clarity.

Influent means (not shown) delivers liquid to be filtered to the top of the filter media as indicated by the arrows "I" and effluent means (not shown) discharges liquid filtered through the media 32 and the plates 30 from the filter system 4 at a level below the plates 30 as indicated by the arrows "E".

In operation of filter systems 2, a washwater hood 38 cooperates with additional washwater means (not shown) to move backwash water in the direction of arrows "B" up through the plate 30 and media 32 in the cell 16x immediately below the hood 38. Meanwhile, in all the other cells 16, the flow of water is downward as indicated by arrows "I" and "E".

Figure 2:
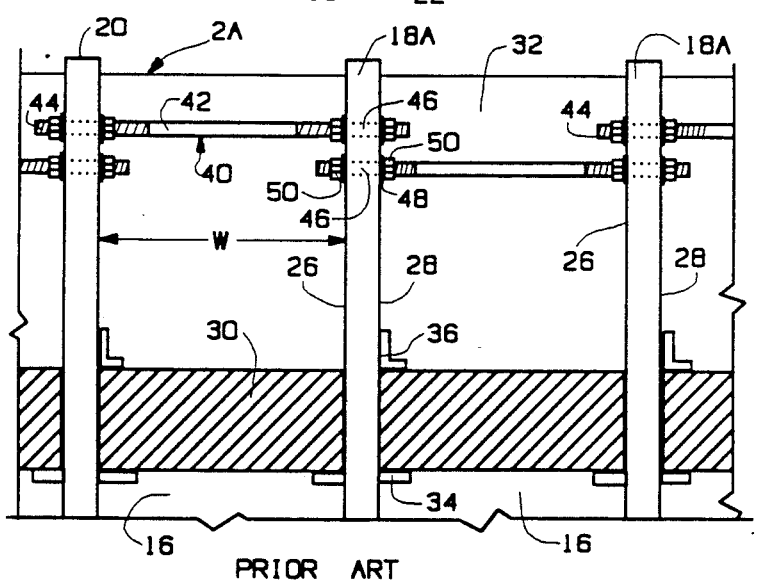
FIG. 2 is a fragmentary, sectional view showing a prior art system for preventing bowing of cell sheets in filter systems as illustrated in FIG. 1.

If the cell sheets 18 are installed in the tank 4 without some form of lateral restraint along their length (illustrated in FIG. 1), they will tend to bow and cause problems as previously indicated. FIG. 2 illustrates how such lateral restrain has been applied in prior known filter systems 2A.

In the filter system 2A of FIG. 2, tie rod assemblies 40 are used to mitigate bowing or deflection of the cell sheets 18A. These assemblies comprise bolts 42 threaded at both ends 44. Such ends 44 are inserted through bores 46 in the cell sheets 18A. Then, four washers 48 and four nuts 50 are applied and tightened to complete each assembly 40 to provide the desired protection against bowing or deflection of the cell sheets 18A, particularly during the backwash mode as described above relative to filter cell 16x.

As can be seem, two bores 46 are required in each cell sheet 18A in the filter systems 2A. Further, each assembly 40 must be installed one piece at a time and before the nuts may be tightened and locked, a precise measurment must be made by the installer.

Figure 3:
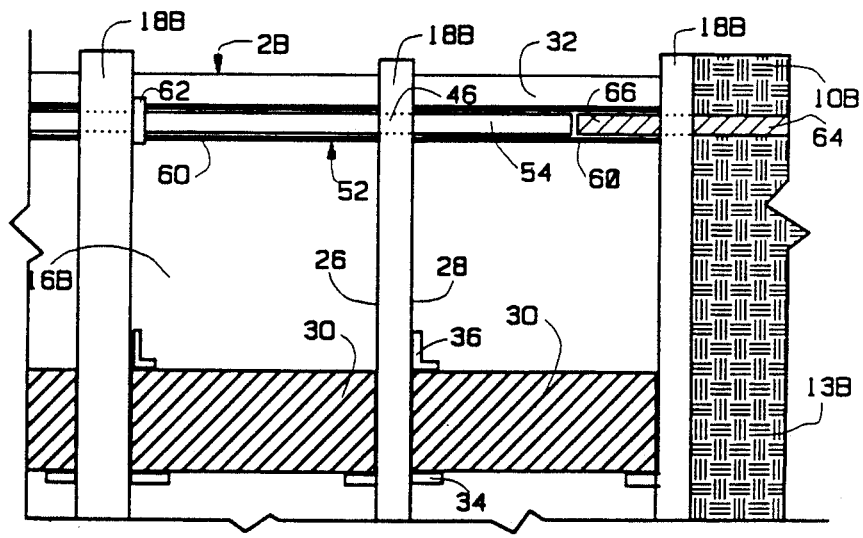
FIG. 3 is a fragmentary, sectional view of a first embodiment of an improved cell sheet installation of the invention in a filter system as illustrated in FIG. 1.

FIG. 3 shows one embodiment of the improved filter cell sheet spacer means 52 of the invention in a filter system 2B.

The spacer means 52 comprises fewer parts than prior art assemblies 40, namely, stringer 54, a plurality of tubes 60 of substantially the same length equal to the width W of the cells 16B and a single bore 46 through each cell sheet 18B. In the event a slight adjustment to the length of a tube 60 is needed to span a particular cell 16B, an annular shim 62 may be used.

The side wall 10B of the filter system 2B has a grouted buttress 13B in which an all-thread rod 64, e.g., SS metal or the like, has been embedded in construction of the wall 10B. The end 66 of rod 64 extends through the cell sheet 18 B into the filter cell 16B and forms an extreme end of the stringer 54 of the spacer means 52. The rod 64 also serves the function of supporting the outside cell sheet 18B during the pour of the grouted buttress 13B.

Figure 4:
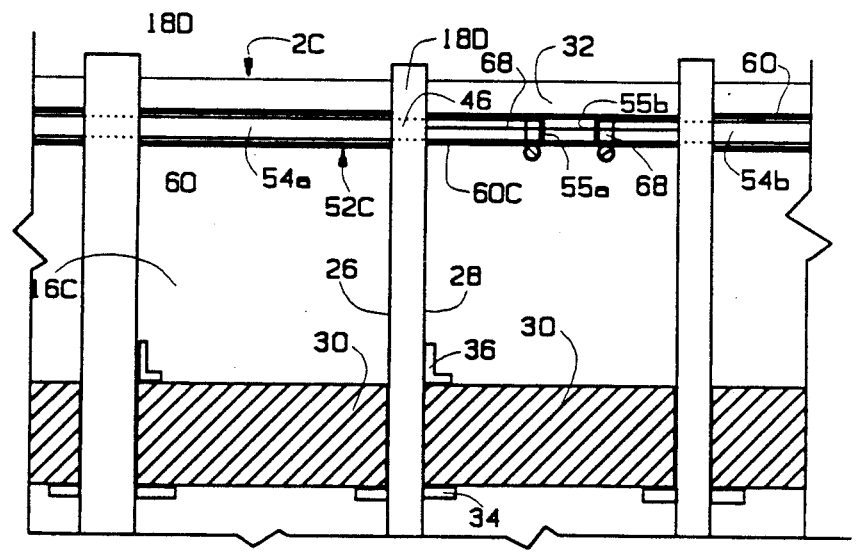
FIG. 4 is a a fragmentary, sectional view of a second first embodiment of an improved cell sheet installation of the invention in a filter system as illustrated in FIG. 1.

In a second embodiment shown in FIG. 4, the filter system 2C comprises cells 16C defined by cell sheets 18C having bores 46 therein and spacer means 52C.

The spacer means 52C comprises rigid tubes 60 and stringers 54a and 54b whose ends 55a and 55b approach one another. The rigid tube 60C, which surrounds the stringers 54a and 54b and the space between the ends 55a and 55b, includes a longitudinal slot. Pipe clamps 68 are applied around the split tube 60C in the region of ends 55a and 55b to force the split tube 60c into contact with the stringers 54a and 54b to create, in effect, a single stringer from two sections 54a and 54b.

Figure 5:
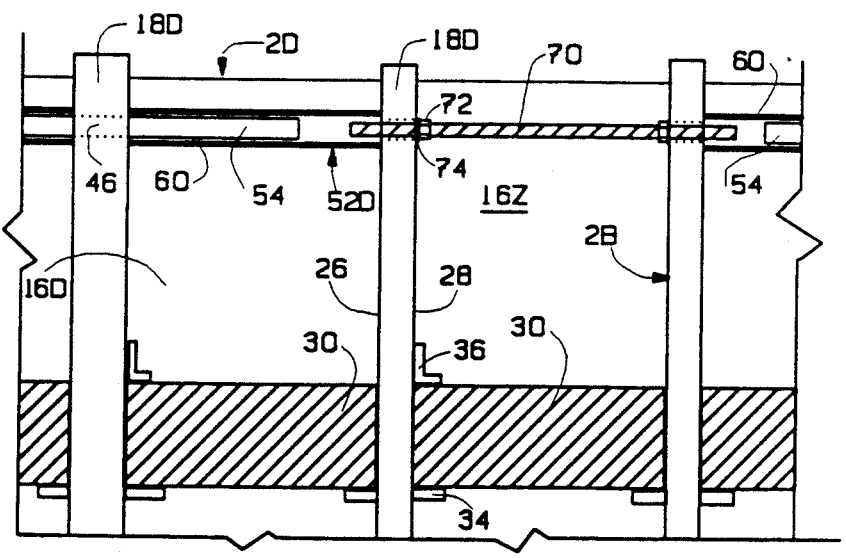
FIG. 5 is a fragmentary, sectional view of a third embodiment of an improved cell sheet installation of the invention in a filter system as illustrated in FIG. 1.

The third embodiment of the invention shown in FIG. 5 illustrated another arrangement for making the final connection of stringers that do not extend the full width of a filter system to which the new spacer means are applied.

The filter system 2D comprises cells 16D defined by cell sheets 18D having bores 46 therein and spacer means 52D that include rigid tubes 60 and stringers 54 that do not extend into the filter cell 16Z. In order to complete the assembly of the spacer means 52D in the cell 16Z, an all-thread rod 70 carrying a pair of nuts 72 and washers 74 is extended through the bores 46 in the cell sheets 18D defining the cell 16Z. Then the nuts 72 are adjusted to compress to facing walls of the cell sheets 18D against the nuts 72 and the opposite walls against the respective rigid tubes 60.

Figure 6:
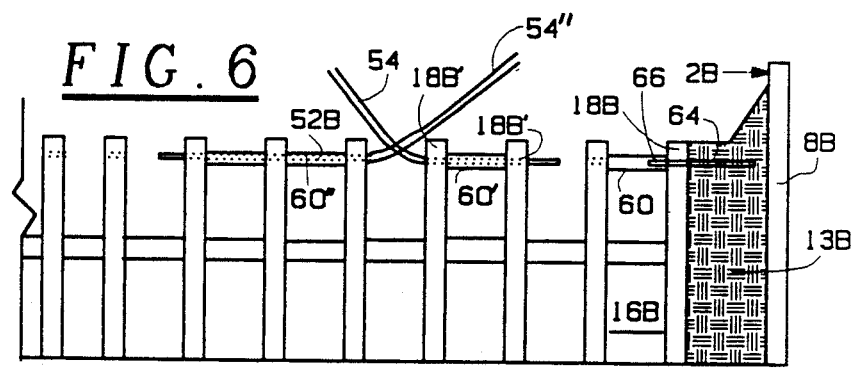
FIG. 6 is a diagrammatic view of a preferred method for installation of the stringers in the spacer means for filter systems of the invention.

FIG. 6 illustrates the relatively simple manner in which the new spacer means of the invention can be accomplished in the field. With wall 8B, grouted buttress 13B, all-thread rod 64 and cell sheets 18B of the filter system 2B in place, a rigid tube 60 is positioned in the right most filter cell 16B and over the exposed end 66 of rod 64. Then, at some suitable location between the sidewalls of the filter system 2B, a second rigid tube 60' is positioned between a pair of cell sheets 18B' so that a flexible stringer 54 can be fed through a bore (not shown) in one of the sheets 18B' and the tube 60'. This operation is then repeated with successive cells and additional tubes 60' (not shown) until the leading end of tube 60' reaches the cell containing the tube 60 thereby creating an arrangement as illustrated in FIG. 3. Next, the other direction in the filter system 2B can have spacer means 52B installed by repeated positioning of more rigid tubes 60" and another stringer 54". Finally, the installation can be completed by making a final connection in the filter cell used for the feeding of the stringers 54 and 54" as shown in FIGS. 4 or 5.

The spacer means installations of the invention greatly simplify filter system assembly, reduce number of parts, insures greater accuracy and reduces costs as compared to the prior art. The rigid tubes 60 are precut to the required length in the supplier's shop so field measurement is unnecessary and the installation of the stringer or stringers does not require any time consuming, detailed measurements.

The embodiments of the invention in which an exclusive property or privilege is claimed are defined as follows:

1. In an automatic backwash filter system including a filter tank defined by a bottom, first and second opposed, parallel side walls, and third and fourth opposed parallel side walls divided into a multiplicity of seriate cells of substantially the same width W by a plurality of substantially vertical rectangular cell sheets defined by a top edge, a bottom edge, a pair of side edges, a first exposed surface on one side and a second exposed surface on the other side of each said cell sheet, said cell sheets running parallel to said first and second side walls, each of said cells containing a horizontal rigid porous filter plate located between said exposed surfaces of its said respective cell sheets at a position above said tank bottom, filter media contained in said cells and supported on said porous plates, influent means for delivering liquid to be filtered to the top of said filter media and effluent means for discharging liquid filtered through said media and said plates from said filter system at a level below said plates the improvement which comprises:
   spacer means for mitigating bowing of said cell sheets, said spacer means including:
   bores extending through each cell sheet from said first exposed surface to said second exposed surface thereof, all said bores being horizontally aligned and located substantially the same distance below said top edges of said cell sheets,
   at least one flexible stringer extending through said bores, and
   a plurality of rigid tubes of approximately the same length substantially equal to said same width W, each said tube being positioned coaxially over said stringer within one of said cells and forming a spacer element between the exposed surfaces of an adjacent pair of said cell sheets defining the filter cell.

2. In an automatic backwash filter system including a filter tank defined by a bottom, first and second opposed, parallel side walls, and third and fourth opposed parallel side walls divided into a multiplicity of seriate cells of substantially the same width by a plurality of substantially vertical rectangular cell sheets of substantially the same thickness defined by a top edge, a bottom edge, a pair of side edges, a first exposed surface on one side and a second exposed surface on the other side of each said sheet, said cell sheets running parallel to said first and second side walls, each of said cells containing a horizontal rigid porous filter plate located between said exposed surfaces of its respective cell sheets at a position above said tank bottom, filter media contained in said cells and supported on said porous plates, influent means for delivering liquid to be filtered to the top of said filter media and effluent means for discharging liquid filtered through said media and said plates from said filter system at a level below said plates, the improvement which comprises:
   spacer means for mitigating bowing of said cell sheets, said spacer means including:
   bores extending through each cell sheet from said first exposed surface to said second exposed surface thereof and through said first and second side walls, all said bores being horizontally aligned a short distance below said top edges of said cell sheets,
   a stringer slightly shorter in length than the distance between the outside surfaces of said first and second walls extending through all said bores,
   a tube of substantially the same length as said width of said cells positioned within each cell coaxially over said stringer in between the exposed surfaces of the cell sheets defining said each cell,
   said stringer being fastened at both ends thereof to said first and second side walls, respectively.

3. In an automatic backwash filter system including a filter tank defined by a bottom, first and second opposed, parallel side walls, and third and fourth opposed parallel side walls divided into a multiplicity of seriate cells of substantially the same width W by a plurality of substantially vertical rectangular cell sheets defined by a top edge, a bottom edge, a pair of side edges, a first exposed surface on one side and a second exposed surface on the other side of each said cell sheet, said cell sheets running parallel to said first and second side walls, each of said cells containing a horizontal rigid porous filter plate located between said exposed surfaces of its said respective cell sheets at a position above said tank bottom, filter media contained in said cells and supported on said porous plates, influent means for delivering liquid to be filtered to the top of said filter media and effluent means for discharging liquid filtered through said media and said plates from said filter system at a level below said plates, the improvement which comprises:
   spacer means for mitigating bowing of said cell sheets, said spacer means including:
   bores extending through each cell sheet from said first exposed surface to said second exposed surface thereof, all said bores being horizontally aligned and located substantially the same distance below said top edges of said cell sheets, a first flexible stringer extending through a first group of successive said bores, a second flexible stringer extending through a second group of successive said bores, a plurality of rigid tubes of the same length substantially equal to said same width W, each said rigid tube being positioned coaxially over one of said stringers within one of said cells and forming a spacer element between the exposed surfaces of an adjacent pair of said cell sheets defining the filter cell, and additional spacer means within those cells of said filter system that do not contain one of said rigid tubes forming a spacer element between the exposed surfaces of an adjacent pair of said cell sheets defining the filter cell lacking one of said rigid tubes.

4. The filter system of claim 3 wherein said additional spacer means comprises an all-thread rod and first and second nuts threaded thereon, said first nut applying pressure to one wall of said cell containing said all-thread rod and said second nut applying pressure to the opposite wall of said cell containing said all-thread rod.

5. The filter system of claim 3 wherein an end of said first flexible stringer abuts an end of said second flexible stringer within one of the cells that does not contain one of said rigid tubes, and said additional spacer means comprises one of said rigid tubes having a longitudinal slot therein positioned around abutting ends of said first and second stringers and clamp means compressing said slotted tube into contact with said abutting ends.

* * * * *